United States Patent
Creamer

[11] 3,816,359
[45] June 11, 1974

[54] POLYSILOXANE CARBAMATE COMPOUNDS

[75] Inventor: Charles Edward Creamer, Ridgefield, Conn.

[73] Assignee: Union Carbide Corporation, New York, N.Y.

[22] Filed: May 10, 1972

[21] Appl. No.: 252,330

[52] U.S. Cl. ............ 260/2.5 S, 210/40, 117/123 D, 117/155 R, 260/37 SB, 260/46.5 E, 260/46.5 G, 260/77.5 R, 260/448.2 N
[51] Int. Cl. ........................................... C08d 13/08
[58] Field of Search ............ 210/40; 260/2.5, 2.5 S, 260/46.5 E, 46.5 G, 448.2 N, 77.5 R

[56] References Cited
UNITED STATES PATENTS
3,284,485   11/1966   Goossens ........................... 260/46.5
3,364,175   1/1968   Di Paola ........................... 260/46.5

*Primary Examiner*—Melvyn I. Marquis
*Attorney, Agent, or Firm*—Reynold J. Finnegan

[57] ABSTRACT

An organopolysiloxane polymer free from hydroxyl radicals, which contains at least one carbamate radical having the formula

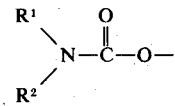

wherein $R^1$ is hydrogen or a monovalent hydrocarbon radical; $R^2$ is a monovalent hydrocarbon radical; said carbamate radical being directly bonded to an internal silicon atom of said polymer; as well as a method for preparing crosslinked siloxane foams by reacting polysiloxane carbamates with a hydroxy containing compound; a method for controlling, removing and/or recovering petroleum oil from water using said foams; and the crosslinked foamed products derived from said methods.

27 Claims, No Drawings

POLYSILOXANE CARBAMATE COMPOUNDS

This invention relates to novel organosilicon compounds and more particularly to novel N,N-diorganocarbamate substituted polysiloxane compounds.

While the prior art, e.g. German Pat. No. 1,157,226, and U.S. Pat. Nos. 3,284,485 and 3,364,175, has disclosed certain monomeric silyl carbamates, that is N,N-diorganocarbamate silanes, it has been silent with regard to polymeric siloxane carbamates.

Thus it is an object of this invention to provide N,N-diorganocarbamate substituted polysiloxane polymer compounds. Other objects and advantages of this invention will become readily apparent from the following description and claims.

The novel N,N-diorganocarbamate substituted polysiloxane compounds of this invention include any organosilicon polymer free from hydroxyl radicals and containing at least one N,N-diorganocarbamate radical of the formula

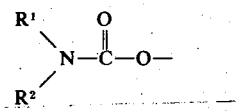

wherein $R^1$ is hydrogen or a monovalent hydrocarbon radical and wherein $R^2$ is a monovalent hydrocarbon radical, said carbamate radical being directly bonded to an internal (pendant) silicon atom of said polymer.

More particularly the N,N-diorganocarbamate substituted polysiloxanes encompassed by the instant invention are organopolysiloxane carbamates, free from hydroxyl radicals, composed essentially of siloxy units having the formula

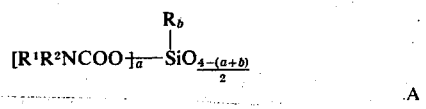

.A wherein $R^1$ and $R^2$ are the same as defined above; wherein R is a radical selected from the group consisting of hydrogen, a monovalent hydrocarbon radical, a substituted monovalent hydrocarbon radical wherein the substituents are selected from the group consisting of halogen, e.g., chlorine, bromine and fluorine, nitro, cyano, alkoxy and the like; and an amino radical of the formula $-NR^1R^2$ wherein $R^1$ and $R^2$ are the same as defined above; wherein $a$ is an integer of from 1 to 3 inclusive; wherein $b$ has a value of from 0 to 2 inclusive, and wherein the sum of $(a+b)$ has a value of from 1 to 3 inclusive, as well as, organopolysiloxane carbamates, free from hydroxyl radicals, containing at least one siloxycarbamate unit represented by formula (A) above and at least one organosiloxy unit represented by the formula

B wherein $R^3$ is a radical selected from the group consisting of R as defined in formula (A) above, R"O—, R"COO—, R"$_2$NO—, R"CONR'", and a R"S— radical wherein R" is a monovalent hydrocarbon radical as defined above; wherein R'" is hydrogen or a monovalent hydrocarbon radical, and wherein c has a value of 0 to 3; with the proviso that when $R^3$ is not R, the radicals or radicals represented by $R^3$ are bonded to a terminal silicon atom of the siloxane polymer.

Accordingly the organopolysiloxane carbamates of the instant invention can contain siloxycarbamate units, such as $(R)(X)SiO-$, $(R)_2(X)SiO_{0.5}$, $(X)_3SiO_{0.5}$, $R(X)_2SiO_{0.5}$, $(X)_2SiO$ and $XSiO_{1.5}$, wherein X represents the N,N-diorganocarbamate radical, $R^1R^2NCOO-$ as defined above, the preferred siloxycarbamate units being $(R)(X)SiO-$ and $(R)_2(X)SiO_{0.5}$. Of course said organopolysiloxane carbamates can also contain one or more organosiloxy units such as $(R^3)_3SiO_{0.5}$, $(R^3)_2SiO$, $R^3SiO_{1.5}$ or $SiO_2$, wherein $R^3$ is the same as defined above.

Thus due to the varying functionality of the siloxy units the organopolysiloxane carbamates of the instant invention are not limited to any particular class or type of polymeric compounds, but broadly include all classes and types of polymers whether they be linear, branched, cyclic or crosslinked, or combinations of such structures and the like. It is to be also understood that while said polymers can be discrete chemical compounds they are usually mixtures of various discrete polymer species due at least in part to the fact that the siloxamine starting materials used to produce the siloxane carbamates of this invention are themselves usually mixtures.

Preferably the siloxane carbamates of this invention are copolymer type compounds composed essentially of from about 0.5 to about 99 mole per cent of siloxycarbamate units represented by formula (A) above and from about 0.5 to about 99 mole per cent of organosiloxy units represented by formula (B) above.

Illustrative of the monovalent hydrocarbon groups that may be represented by R, $R^3$, R" and R'" in the above formulas are alkyl groups (such as, methyl, ethyl, propyl, isopropyl butyl, pentyl, hexyl, octyl, decyl, dodecyl, octadecyl, eicosyl, and the like); aryl groups (such as phenyl, naphthyl, and the like); alkenyl groups (such as vinyl, allyl and the like); cycloalkenyl groups (such as cyclohexenyl and the like); aralkyl groups (such as benzyl, phenylethyl, and the like); alkaryl groups (such as tolyl, xylyl and the like); and cycloalkyl groups (such as cyclohexyl and the like). If desired such groups can be substituted with substituents such as cyano, nitro, halgoen, alkoxy etc. Examples of such substituted groups are cyanoalkyl, e.g., beta-cyanoethyl; nitroaryl, e.g., nitrophenyl; haloalkyl, e.g., chloropropyl, chloroethyl, trifluoropropyl; halophenyl, e.g., bromophenyl; alkoxyalkyl, e.g., methoxyethyl, methoxypropyl, propoxyethyl; propyloxypropyl; and the like. Preferably said R, $R^3$, R" and R'" radicals contain from one to 20 carbon atoms. Most preferably they are unsubstituted monovalent hydrocarbon radicals, while lower alkyl and phenyl radicals are most preferred, especially methyl.

Illustrative of the monovalent hydrocarbon radicals that may be represented by $R^1$ and $R^2$ above are the saturated unsubstituted and substituted monovalent radicals as defined for R above. Similarly the most preferred $R^1$ and $R^2$ radicals are lower alkyl radicals which can be the same or different, although the most preferred diorganocarbamate radical is dimethylcarbamate.

Thus the preferred siloxy carbamate units that can be present in the novel organopolysiloxane carbamate polymers of this invention can be more specifically illustrated as $((CH_3)_2NCOO)(CH_3)SiO$; $((CH_3)_2NCOO)(CH_3)_2SiO_{0.5}$; $((CH_3)_2NCOO)_3SiO_{0.5}$; $((CH_3)_2NCOO)_2CH_3SiO_{0.5}$; $((CH_3)_2NCOO)_2SiO$; $((CH_3)_2NCOO)SiO_{1.5}$ units; and the like, especially $((CH_3)_2NCOO)(CH_3)SiO$ and $((CH_3)_2NCOO)(CH_3)_2SiO_{0.5}$ units. Likewise the preferred organosiloxy units in the carbamate polymers can be more specifically illustrated as $(CH_3)_3SiO_{0.5}$; $(CH_3)_2SiO$; $(C_2H_5)_2SiO$; $CH_3SiO_{1.5}$; $((CH_3)_2N)(CH_3)_2SiO_{0.5}$; $((CH_3)_2N)(CH_3)SiO$; $(CH_3O)_3SiO_{0.5}$; $(CH_3)_2(CH_3O)SiO_{0.5}$; $(CH_3)(C_6H_5)SiO$; $(CH_3COO)(CH_3)_2SiO_{0.5}$; $((CH_3)_2NO)(CH_3)_2SiO_{0.5}$; $(CH_3CONCH_3)(CH_3)_2SiO_{0.5}$; $(CH_3S)(CH_3)_2SiO_{0.5}$; $(CH_3)(H)SiO$; $(CH_3)(CH_2=CH)SiO$; $(CH_3)(C_2H_5)SiO$ units and the like, especially $(CH_3)_2SiO$ and $(CH_3)_3SiO_{0.5}$ units.

Accordingly organopolysiloxane carbamates of the instant invention can be represented by the general formula $$[(X)_aSiR_bO_{4-(a+b)/2}]_m[R_cSiO_{4-c/2}]_n$$

wherein $m$ has an average value from 1 to 1,000 and $n$ has an average value of from 0 to 1,000 and wherein $a$, $b$, $c$, R and X are the same as defined above. Of course as pointed out above the organopolysiloxane carbamates may be either homopolymers or copolymers and the radicals R and X associated with a given silicon atom may be the same or different and the siloxycarbamate and organosiloxy units may be present in any sequence or order which satisfies the normal valence requirements of the compositional elements. Essentially linear organopoly-siloxane carbamates are preferred.

The most preferred organopolysiloxane carbamates are essentially linear polymers having the average formula $$X(R)_2SiO[(R)_2SiO]_pSi(R)_2X$$

I wherein $p$ has an average value of 0 to 1,000; wherein R is the same as defined above, preferably a monovalent hydrocarbon radical and more preferably a lower alkyl radical, especially methyl, and wherein X is the same as defined above, preferably a diloweralkylcarbamate radical, especially dimethylcarbamate; and those essentially linear polymers having the average formula $$R_3SiO[(R)_2SiO]_p[R(X)SiO]_rSi(R)_3$$

II wherein R, X and p are the same as defined in formula (I) above and wherein $r$ has a value of 3 to 1000.

The organopolysiloxane carbamate compounds of the instant invention can be prepared from N,N-diorganoamino substituted polysiloxane compounds, hereinafter also referred to as organopolysiloxamines. More specifically the process involves converting the precursor organopolysiloxamines to the corresponding organopolysiloxane carbamates of the instant invention by reaction with carbon dioxide as illustrated by the following skeletal equation $$\equiv Si-N(CH_3)_2 + CO_2 \longrightarrow \equiv Si-O\overset{O}{\overset{\|}{C}}N(CH_3)_2$$

wherein $$\equiv Si-N(CH_3)_2$$

represents a dimethylamino substituted organopolysiloxane compound and $$\equiv Si-O\overset{O}{\overset{\|}{C}}N(CH_3)_2$$

represents the desired corresponding N,N-dimethylcarbamate substituted organopolysiloxane product.

Accordingly, since the reaction is directed to conversion of the amino group to a carbamate group it is elementary that the choice of the organopolysiloxamine starting material merely depends on the particular organopolysiloxane carbamate desired to be produced. Of course it is to be understood that the organopolysiloxamine starting material can be an individual compound, a mixture of polymers of the same class and type or a mixture of polymers of different classes and types. Thus any organosilicon polymer free from hydroxyl radicals containing at least one N,N-diorganoamino radical of the formula $$R^1R^2N-$$

wherein $R^1$ and $R^2$ are the same as defined above can be employed. More particularly the organopolysiloxamine starting materials are composed essentially of aminosiloxy units having the formula $$[R^1R^2N]_a\overset{R_b}{\overset{|}{Si}}O_{\frac{4-(a+b)}{2}}$$

C as well as organopolysiloxamines containing at least one organosiloxy unit represented by formula (C) above and at least one organosiloxy unit represented by the formula $$R^3SiO_{4-c/2}$$

D wherein $a$, $b$, $c$, R, $R^1$, $R^2$ and $R^3$ are the same as defined above.

Of course it also obviously follows from the above description of the preferred organopolysiloxane carbamates that the preferred organopolysiloxamine starting materials are those represented by the general formula $$[(Y)_aSiR_bO_{4-(a+b)/2}]_m[R_cSiO_{4-c/2}]_n$$

wherein $a$, $b$, $c$, $m$, $n$ and R are the same as defined above, and wherein Y represents a N,N-diorganoamino radical, $R^1R^2N-$ as defined above. Likewise the most preferred organopolysiloxamine precursors are those essentially linear polymers having the average formula $$Y(R)_2SiO[(R)_2SiO]_pSi(R)_2Y$$

and/or $$(R)_3SiO[(R)_2SiO]_p[R(Y)SiO]_rSiR_3$$

wherein $p$, $r$, R and Y are the same as defined above.

Such organopolysiloxamine precursors and/or methods for their preparation are well known in the art as witnessed for example by U.S. Pat. Nos. 3,467,686; 3,530,092; 3,535,357, and 3,519,601, the disclosures of which are incorporated herein by reference thereto.

The instant process for preparing the organopolysiloxane carbamates of this invention is not narrowly critical and is preferably conducted under anhydrous conditions at ambient temperatures and pressures although autogeneous pressures at temperatures from −25°C. to about 200°C. may be used, if desired. The absence of hydroxyl radicals on the organopolysiloxamine starting materials and the anhydrous conditions are desired so as to prevent possible side reactions.

The amount of carbon dioxide employed is not narrowly critical and merely depends on whether it is desired to react all or only some of the diorganoaminosilicon bonds in the organopolysiloxamine starting material. For example, theoretically one mole of carbon dioxide will convert one mole of diorganoamine group to one mole of the diorganocarbamate radical. Accordingly one need only employ that amount of carbon dioxide that is at least about stoichiometrically equivalent to the amount or number of $Si-NR^1R^2$ bonds desired to be reacted. Of course, amounts that are less or in excess of said stoichiometric equivalent may be used if desired. In general it is preferred to employ a stoichiometric excess of carbon dioxide to insure conversion of all of the diorganoamino groups to diorganocarbamate radicals.

The reaction process affords an easy and speedy method for preparing the desired organopolysiloxane carbamates. There is no by-product to contend with. The desired organopolysiloxane carbamate product is normally a fluid and recoverable by any suitable conventional method. The amount of carbon dioxide desired to be reacted can be controlled and the completion of the reaction easily determined by monitoring the temperature of the reaction, since the reaction is exothermic, the peak point of said exotherm and subsequent drop in temperature signifying completion of the reaction. Alternatively the molecular weight of the organopolysiloxane carbamate product can be monitored until which time it becomes constant signifying no further reaction of amine and carbon dioxide, thus completion of the process. Accordingly in addition to employing a stoichiometric deficiency of carbon dioxide to product products containing both diorganoamino and diorganocarbamate radicals, alternatively, if desired, one need only stop the preferred reaction from going to completion to achieve the same result. Moreover, while solvent diluents or catalysts are not needed in the instant process the use of minor amounts of solvents, such as conventional hydrocarbon solvents, like toluene, xylene, paraffin oil and the like, and/or catalysts, such as conventional platinum catalysts and the like, may be employed if desired.

The novel organopolysiloxane carbamates of the instant invention are highly useful in the production of a multitude of polymeric siloxane products. Said carbamates can be reacted with hydroxyl containing substances, e.g., water, alcohols, hydroxy substituted silicon compounds, and the like, to produce a wide variety of cross-linked polymeric foams or polymers. Moreover, by varying the composition of the organopolysiloxane carbamate, products ranging from soft, resilient elastomeric foams to hard rigid foams can be obtained.

For instance it was found that organopoly-siloxane carbamate on contact with water reacts vigorously and exothermically so that even at room temperature and below, carbon dioxide gas is formed in situ which causes a rapid thickening and gelation of the polysiloxane to form a self-rising, non-collapsing, crosslinked polymeric siloxane foam. The reaction can be illustrated by the following general skeletal equation.

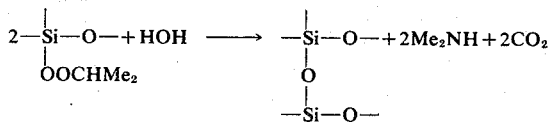

wherein

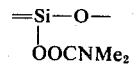

is organopolysiloxane dimethyl carbamate starting material; and

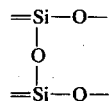

is the desired siloxane foam product. While not wishing to be bound by any theory it is believed that the water splits off the carbamate radical to form a hydroxy substituted siloxane intermediate and carbamic acid. The siloxane intermediate then polymerizes with further carbamate substituted silicon groups in the starting material concurrently with the breaking down of the carbamic acid intermediate to its amine and $CO_2$ gas, which acts as the blowing agent for the reaction.

The reaction is exothermic and can be conducted at temperatures of from about −3°C. to about 200°C. or higher. It is preferably conducted at ambient temperature and atmospheric pressure although sub or superatmospheric pressures could be used if desired. Moreover the process can be carried out batchwise or continuously.

The amount of polysiloxane carbamate starting material is not critical and the starting material can be a single polysiloxane carbamate containing at least two pendant silicon-carbamate radicals or two or more polysiloxane carbamates each containing at least one pendant silicon-carbamate radical, or mixtures of such polysiloxane carbamates. Such starting material mixtures can also contain polysiloxane carbamates having terminal silicon-carbamate radicals. Preferably the polysiloxane carbamate starting materials for foam production contain at least three pendant silicon-carbamate radicals to insure adequate crosslinking and stability of the foam product. The preferred polysiloxane carbamates are those defined hereinabove, especially the polysiloxane dimethylcarbamates because of their high reactivity and simple dimethyl amine by-product.

The amount of water employed is also not narrowly critical. Theoretically at least one mole of water is needed for each mole of silicon-carbamate group desired to be reacted although lower or higher amounts of water can be employed depending upon the foam siloxane product desired. It need only be sufficient to form said foam.

The process can be easily carried out by conventional foaming methods and the amount of foam produced and the rate of reaction easily controlled by such obvious variables as the amount of reactants, temperature of reaction, and the like. For example, the water and polysiloxane carbamate is mixed, transferred to a mold and allowed to cure, in an oven if desirable.

Similarly the organopolysiloxane carbamates of this invention can be reacted with other hydroxy substituted materials, e.g. organic alcohols, organic polyols, hydroxy substituted silanes, hydroxy substituted siloxanes, and the like to prepare further self-rising crosslinked stable polymeric foams or other silicone polymers. For example, similar polymeric foams can also be prepared by reacting polysiloxane carbamates having pendant, preferably at least three, silicon-carbamate radicals with organic polyols, polyhydroxy silicon compounds, e.g. polyhydroxy silanes and/or polyhydroxysiloxanes. Polysiloxane carbamates having terminal silicon-carbamate radicals can be reacted with trifunctional hydroxy substituted materials such as trifunctional polyols or trihydroxy substituted silicon compounds, e.g. glycerine, to also produce crosslinked siloxane foams. Moreover various silicone polymers, e.g. siloxane fluids, oils, etc. can be prepared by reacting polysiloxane carbamates having pendant silicon-carbamate radicals with a mono-hydroxy substituted material, e.g. an organic alcohol. Such crosslinked foam products and silicone polymer products can of course be used in the same areas and for the same purposes as those of conventionally known foams and silicon compounds.

Another unique feature of the instant invention has been the discovery that the organopolysiloxane carbamates of this invention can be employed to remove and/or recover undesired oil films from water, e.g. petroleum oil product spillage caused by shipping tankers, off-shore oil-well leaks, and the like. The process merely involves contacting the organopolysiloxane carbamate with the oil film floating on the water surface by any suitable method, such as spraying, pouring, or otherwise mixing and the like. The organopolysiloxane carbamate then dissolves in the oil film and diffuses to the oil-water interface where the carbamate polymer and water react as explained above to form a crosslinked siloxane foam which absorbs and emmeshes the oil. The consistency of the oil-foam product can be varied from rubbery gels to stiff rock-like foamed substances which float upon the water and which can be mechanically harvested from the water surface by any suitable method. Such provides a unique aide in recovering and/or removing such undesirable oil from the water. If desired the foam can be ignited and burned. Alternatively, it can be netted, scooped or skimmed off of the surface of the water by any suitable method. It can easily be removed from beaches where it has been dragged or washed ashore by scooping, shoveling, plowing, raking, etc. It also affords a unique means for removing the oil so that part of the oil can be recovered, e.g. by compressing the foam, as well as a method for controlling the oil spillage within a desired area, e.g. by means of log-boons, conventional styrene foam barriers, and the like until the oil foam product can be harvested.

The amount of organopolysiloxane carbamate need only be sufficient to form that amount of foam necessary to emmesh the amount of oil desired to be removed and from 1–5 parts by weight of siloxane carbamate per 100 parts by weight of oil should usually suffice, although lower or higher amounts can be used if desired. Preferably polysiloxane carbamates having at least three pendant silicon-carbamate radicals should be employed and most preferably polysiloxane dimethylcarbamates as shown above.

While the above invention has been described in particular in connection with the removal and/or recovery of oil from salt water (sea water) it is of course understood that the method is applicable with regard to oil spills on salt-free water and that the term oil refers to any type of petroleum product.

The following examples are illustrative of the present invention and are not to be regarded as limitative. It is to be understood that all parts, percentages and proportions referred to herein and in the appended claims are by weight unless otherwise indicated. As used herein Me represents a methyl radical, Et represents an ethyl radical, Vi represents a vinyl radical and $\phi$ represents a phenyl radical.

EXAMPLE 1

Fifty grams of a siloxamine polymer having the average formula

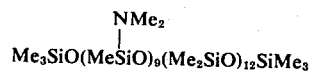

were charged to a 200 cc. reaction flask equipped with a gas bubbling tube and an air cooled condenser system. The flask, siloxamine polymer reactant, and condenser system were found to weigh 481.1 grams.

Anhydrous $CO_2$ was bubbled through the siloxamine polymer reactant at ambient temperature for a period of six hours during which a slight exotherm was observed. After cooling to ambient temperature the flask and contents were then heated to 100°C. and sparged with dry nitrogen to remove excess dissolved $CO_2$. Upon cooling to room temperature the flask, contents and condenser system were found to weight 491.2 grams for a net gain of 10.1 grams of $CO_2$ demonstrating that the reaction of the pendent dimethyl nitrogen group reacted quantitatively to yield the desired siloxane-carbamate polymer product by the reaction:

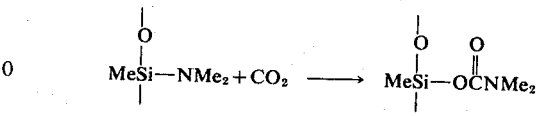

About 60 grams of the desired siloxane-carbamate polymer product having the average formula

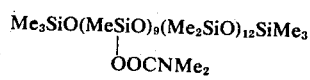

and a molecular weight of about 2,370 was recovered by pouring the homogeneous amber to blackish liquid product from the flask. Further analysis, infrared, elemental and cryoscopic molecular weight, confirmed the structural formula given above of the desired siloxane-carbamate polymer product.

EXAMPLE 2

One hundred grams of a siloxamine polymer having the average formula $$\underset{\underset{NMe_2}{|}}{Me_3SiO(MeSiO)_{4.5}(Me_2SiO)_{12}SiMe_3}$$

were charged to a 200 cc. reaction flask equipped with a gas bubbling tube and an air cooled condenser system. Anhydrous $CO_2$ was bubbled through the siloxamine polymer reactant at ambient temperature for a period of sixteen hours during which a slight exotherm was observed. After cooling to ambient temperature the flask and contents were heated to 100°C. and sparged with dry nitrogen to remove excess dissolved $CO_2$. Upon cooling to room temperature about 104 grams (about a 95% yield) of the desired siloxane-carbamate polymer product having the average formula $$\underset{\underset{OOCNMe_2}{|}}{Me_3SiO(MeSiO)_{4.5}(Me_2SiO)_{12}SiMe_3}$$

and a molecular weight of about 1,711.5 was recovered by pouring the desired product, a homogeneous amber to blackish liquid, from the reaction flask.

EXAMPLE 3

Following the procedure described above and by varying the choice of silicon-nitrogen polymer starting materials other polysiloxane-carbamate polymers may be prepared which correspond to the choice of said starting materials, such as $$\underset{\underset{OOCNMe_2}{|}}{Me_3SiO(MeSiO)SiMe_3}$$

$$\underset{\underset{OOCNHMe}{|}}{Me_3SiO(MeSiO)_3SiMe_3}$$

$$\underset{\underset{OOCNEt_2}{|}}{Me_3SiO(MeSiO)_3SiMe_3}$$

$$\underset{\underset{OOCNMeEt}{|}}{Me_3SiO(MeSiO)_3SiMe_3}$$

$$\underset{\underset{OOCNMe_2}{|}}{Me_3SiO(MeSiO)_{4.5}(Me_2SiO)_{100}SiMe_3}$$

$$\underset{\underset{OOCNMe_2}{|}}{Me_3SiO(MeSiO)_9(Me_2SiO)_{500}SiMe_3}$$

$$\underset{\underset{OOCNMe_2}{|}}{Me_3SiO(MeSiO)_3(Me_2SiO)_{1000}SiMe_3}$$

$$\underset{\underset{OOCNMe_2}{|}}{Me_3SiO(MeSiO)_{1000}(Me_2SiO)_{1000}SiMe_3}$$

$$\underset{\underset{OOCNMe_2}{|}}{Me_3SiO(MeSiO)_{4.5}(Et_2SiO)_{20}SiMe_3}$$

$$\underset{\underset{OOCNMe_2}{|}}{Me_3SiO(MeSiO)_3(Me_2SiO)SiMe_3}$$

$$\underset{\underset{OOCNMe_2}{|}}{Me_3SiO(MeSiO)_3Si(Me_2)OCONMe_2}$$

$$\underset{\underset{OOCNMe_2}{|}}{Me_2NOCO(Me_2)SiO(MeSiO)_3Si(Me_2)OCONMe_2}$$

$$\underset{\underset{OOCNMe_2}{|}}{Me_3SiO(MeSiO)_3(Me_2SiO)_{15}(\phi_2SiO)_5SiMe_3}$$

$$\underset{\underset{OOCNMe_2}{|}}{Me_3SiO(MeSiO)_9(Me_2SiO)_{50}(Et_2SiO)_{18}SiMe_3}$$

$$\underset{\underset{OOCNMe_2}{|}}{Me_3SiO(MeSiO)_3(Me_2SiO)_{18}(ViMeSiO)_3SiMe_3}$$

$$\underset{\underset{OOCNMe_2}{|}}{Me_3SiO(MeSiO)_{15}(Me_2SiO)_{100}(\phi MeSiO)_{10}SiMe_3}$$

$$\underset{\underset{OOCNMe_2}{|}}{Me_3SiO(MeSiO)_9(Me_2SiO)_{20}(Me(NCC_3H_6)SiO)_3SiMe_3}$$

$$\underset{\underset{OOCNMe_2}{|}}{Me_3SiO(MeSiO)_{70}SiMe_3}$$

EXAMPLE 4

To about 2 cc. of the siloxane-carbamate polymer product having the average formula $$\underset{\underset{OOCNMe_2}{|}}{Me_3SiO(Me_2SiO)_9(MeSiO)_{12}SiMe_3}$$

of Example 1 in a graduated beaker, one cc. of distilled water was added and homogenized into the polymer at ambient temperature. Within seconds an exothermic reaction began, the polymer began to gas vigorously and within two minutes increased in volume to a crosslinked, dimensionally stable white siloxane foam rubber having a volume of about 8 cubic centimeters, a net foam rubber rise of 5 cc. The siloxane foamed rubbery material exhibited the typical compression-deflection characteristics of a foamed silicone rubber. The siloxane foam rubber product had very good resilience and appeared to have a uniform cell size of about one thirty-second of an inch.

EXAMPLE 5

In a 5 cc. graduated beaker, 1 gram of a siloxane-carbamate polymer having the average formula $$\underset{\underset{OOCNMe_2}{|}}{Me_3SiO(Me_2SiO)_9(MeSiO)_{12}SiMe_3}$$

was charged and mixed at ambient temperature with 3 grams of a siloxane fluid having the formula $$\underset{Me\quad Me}{\overset{Me\quad Me}{HOSiO(Me_2SiO)_3SiOH}}$$

Instantly the mixture began to exothermically react and in about 4 minutes resulted in a stable uniform celled, crosslinked, tack-free siloxane foam rubber having a volume of 16 cubic centimeters, a net foam rubber rise of 12 cc. The siloxane foamed rubbery product material exhibited the typical compression-deflection characteristics of a foamed silicone rubber and had very good resilience.

EXAMPLE 6

One hundred cc. of tap water was charged to a 250 cc. beaker. Forty grams of "Bunker C" a thick crude oil were charged and the oil formed an immiscible, low viscosity layer on the surface of the water. Five grams of a siloxane-carbamate polymer having the average formula $$\underset{\underset{OOCNMe_2}{|}}{Me_3O(Me_2SiO)_{12}(MeSiO)_9SiMe_3}$$

were poured onto the oil layer at ambient temperature. The siloxane carbamate polymer spread rapidly on the surface of the oil and then dissolved in the oil layer to the water surface. Within a few minutes, bubbling was observed at the oil-water interface and the volume of the oil layer appeared to increase slightly due to foaming of the siloxane. Bubbling increased throughout the oil layer for about ten minutes when it was noted that the oil layer began to thicken in viscosity. As the foam expanded it emmeshed the oil creating a thick non-flowable, foamed mass that floated on the water. Within 30 minutes the oil layer was essentially completely entrapped in the resultant foamed mass which while quite crumbly was easily scooped up and removed in total from the surface of the water. Much of the oil was recovered by compressing the resultant foamed mass to exude the oil. Moreover oil was not found to leach out from the resultant foamed mass when it was put on sand.

EXAMPLE 7

The procedure of Example 6 was repeated except that about 1-2 grams of a siloxane-carbamate polymer having the average formula

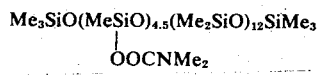

$Me_3SiO(MeSiO)_{4.5}(Me_2SiO)_{12}SiMe_3$
                |
              OOCNMe_2 was poured onto the oil layer at ambient temperature. Again within a few minutes a foamed mass developed which entrapped the oil and floated on the water. After the foamed oil mass had been soaking for about three hours it was ignited with the aide of about 2 cc. of hexane. Most of the oil burned off leaving a chared solid mass which self-extinguished in about 5 to ten minutes.

EXAMPLE 8

The procedure of Example 6 was repeated except that the water was sea water and about 2 grams of the siloxane carbamate polymer was employed. A foamed mass having the oil emmeshed in it and about the same consistency as the foam product of said Example 6 was formed and was easily removed from the surface of the water by scooping it therefrom.

The compounds of this invention are also useful as protective coatings in the treatment of cellulosic materials such as textiles and paper, and glass surfaces to provide water-repellent qualities, and in the treatment of rubber, plastic and ceramic insulations to prevent arc-over under humid conditions, and in the treatment of masonry, concrete and ceramic surfaces to reduce water absorption and spalling, and in the treatment of silica fillers to render said fillers hydrophobic.

Various modifications and variations of this invention will be obvious to a worker skilled in the art and it is understood that such modifications and variations are to be included within the purview and scope of this application and the spirit and scope of the appended claims.

What is claimed is:

1. An organopolysiloxane polymer, free from hydroxyl radicals, which contains at least one N,N-diorganocarbamate radical of the formula

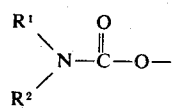

wherein $R^1$ is hydrogen or a monovalent hydrocarbon radical and wherein $R^2$ is a monovalent hydrocarbon radical, said carbamate radical being directly bonded to an internal silicon atom of said polymer.

2. An organopolysiloxane polymer as defined in claim 1 wherein $R^1$ and $R^2$ are methyl radicals.

3. An organopolysiloxane polymer as defined in claim 1, selected from the class consisting of organopolysiloxane carbamates having the formula

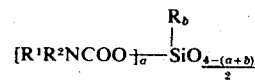

$$[R^1R^2NCOO]_a\!\!-\!\!\underset{\underset{2}{}}{\overset{R_b}{\underset{|}{Si}}}O_{\frac{4-(a+b)}{2}}$$

A wherein $R^1$ is hydrogen or a monovalent hydrocarbon radical, wherein $R^2$ is a monovalent hydrocarbon radical; wherein R is a radical selected from the group consisting of hydrogen, a monovalent hydrocarbon radical; an amino radical of the formula $-NR^1R^2$ wherein $R^1$ and $R^2$ are the same as defined above; and a substituted monovalent hydrocarbon radical wherein the substituents are selected from the class consisting of halogen, nitro, cyano and alkoxy; $a$ is an integer of from 1 to 3 inclusive; $b$ has a value of from 0 to 2 inclusive; and the sum of $(a+b)$ is 1 to 3 inclusive; and organopolysiloxane carbamates composed essentially of from about 1 to about 99 mole per cent of siloxy carbamate units represented by formula (A) above and 1 to 99 mole per cent of organosiloxy units represented by the formula

$$R_c^3SiO_{4-c/2}$$

B wherein $R^3$ is a radical selected from the group consisting of R as defined above, $R''O-$, $R''COO-$, $R_2''NO-$, $R''CONR-'''$, and a $R''S-$ radical wherein $R''$ is a monovalent hydrocarbon radical, wherein $R'''$ is hydrogen or a monovalent hydrocarbon radical, and wherein $c$ has a value of 0 to 3; with the proviso that when $R^3$ is not R, the radical or radicals represented by $R^3$ are bonded to a terminal silicon atom of the polymer.

4. An organopolysiloxane polymer as defined in claim 3 wherein $R^1$ and $R^2$ are lower alkyl radicals.

5. An organopolysiloxane polymer as defined in claim 4, wherein the polymer contains at least three pendant silicon atoms each having directly bonded thereto a dimethylcarbamate radical represented by the formula $-OOCN(CH_3)_2$.

6. An organopolysiloxane polymer as defined in claim 3, having the average formula

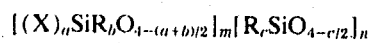

$$[(X)_aSiR_bO_{4-(a+b)/2}]_m[R_cSiO_{4-c/2}]_n$$

wherein X is a carbamate radical of the formula $-OOCNR^1R^2$; wherein $m$ has an average value of from 1 to 1,000 and $n$ has an average value of from 0 to 1,000.

7. An organopolysiloxane polymer as defined in claim 6, wherein $R^1$ and $R^2$ are lower alkyl radicals and R is a monovalent hydrocarbon radical.

8. An organopolysiloxane polymer as defined in claim 7, wherein $R^1$ and $R^2$ are methyl radicals.

9. An organopolysiloxane polymer as defined in claim 8 wherein R is a methyl radical.

10. An organopolysiloxane polymer as defined in claim 8, wherein the polymer contains at least three pendant silicon atoms each having directly bonded thereto a dimethylcarbamate radical represented by the formula $-OOCN(CH_3)_2$.

11. An essentially linear organopolysiloxane polymer as defined in claim 3, having the average formula $$(R)_3SiO[(R_2)SiO]_p[R(X)SiO]_rSiR_3$$

wherein X is a carbamate radical of the formula $-OOCNR^1R^2$; and wherein $r$ has an average value of from 3 to 1,000 and $p$ has an average of from 0 to 1000.

12. An organopolysiloxane polymer as defined in claim 11, wherein $R^1$ and $R^2$ are lower alkyl radicals and R is a monovalent hydrocarbon radical.

13. An organopolysiloxane polymer as defined in claim 12, wherein $R^1$ and $R^2$ are methyl radicals.

14. An organopolysiloxane polymer as defined in claim 13, wherein R is a lower alkyl radical.

15. An organopolysiloxane polymer as defined in claim 14 wherein R is a methyl radical.

16. A process for preparing a crosslinked polymeric siloxane foam product which comprises reacting an organopolysiloxane carbamate polymer as defined in claim 1 with a hydroxy containing compound.

17. A process as defined in claim 16, wherein the hydroxy compound is water.

18. A process as defined in claim 17, wherein the organopolysiloxane carbamate polymer reactant has the average formula $$R_3SiO[(R)_2SiO]_p[RSiO]_rSiR_3$$
$$\phantom{R_3SiO[(R)_2SiO]_p[R}|\phantom{SiO]_rSiR_3}$$
$$\phantom{R_3SiO[(R)_2SiO]_p[R}OOCN(CH_3)_2$$

wherein R is a monovalent hydrocarbon radical; $p$ has an average value of from 0 to 1,000 and $r$ has an average value of from 3 to 1,000.

19. A process as defined in claim 18 wherein R is a lower alkyl radical.

20. A process as defined in claim 19, wherein R is a methyl radical.

21. A process as defined in claim 18, wherein the water is sea water.

22. The crosslinked siloxane foam product prepared according to the process as defined in claim 16.

23. The crosslinked siloxane foam product prepared according to the process as defined in claim 17.

24. The crosslinked siloxane foam product prepared according to the process as defined in claim 18.

25. The crosslinked siloxane foam product prepared according to the process as defined in claim 19.

26. The crosslinked siloxane foam product prepared according to the process as defined in claim 20.

27. The crosslinked siloxane foam product prepared according to the process as defined in claim 21.

* * * * *